Feb. 21, 1967 T. ASHWORTH, JR 3,304,579
DUAL HINGED SIDE DELIVERY HEAD FOR EXTRUDERS
Filed March 30, 1965
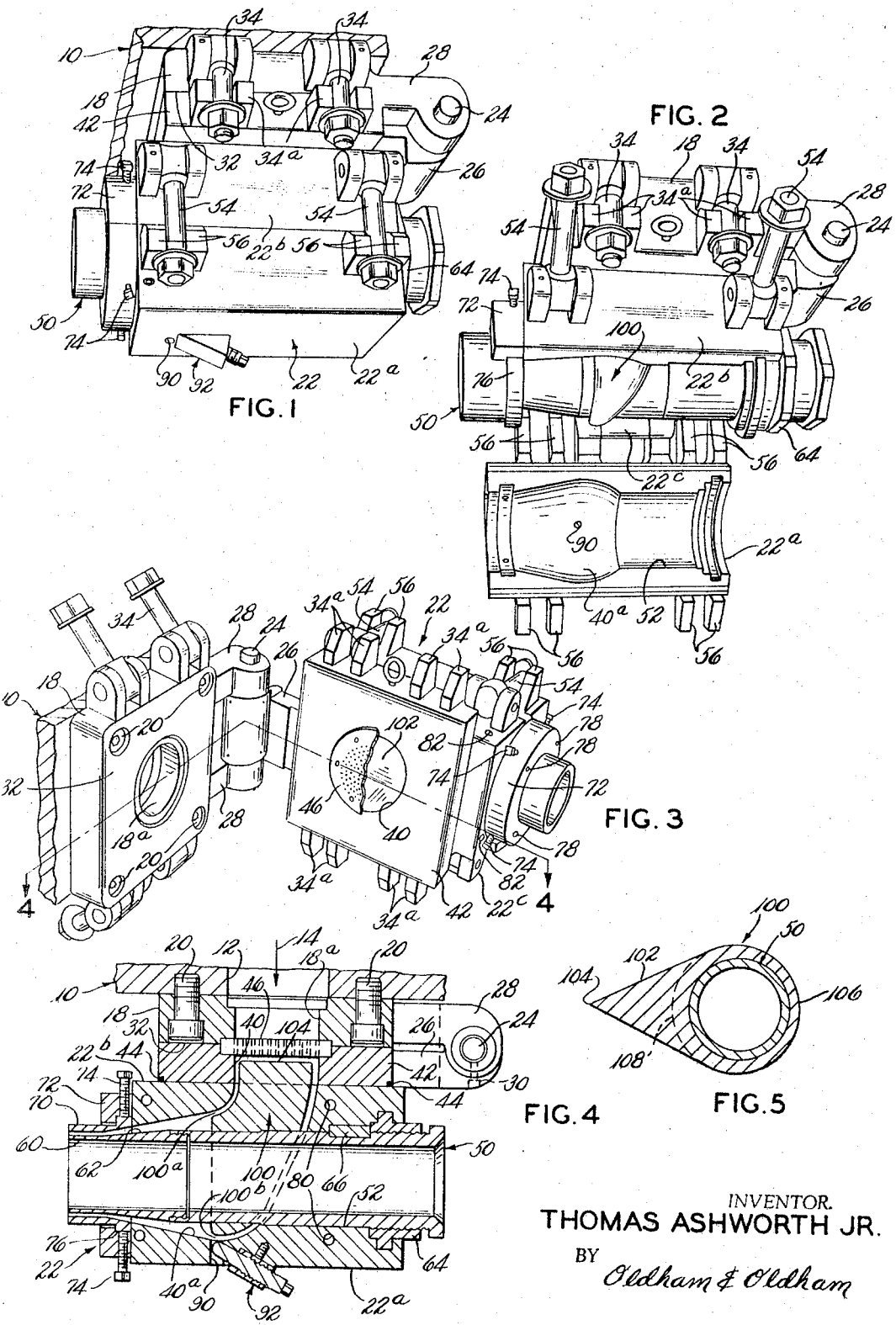
INVENTOR.
THOMAS ASHWORTH JR.
BY Oldham & Oldham
ATTYS.

United States Patent Office 3,304,579
Patented Feb. 21, 1967

3,304,579
DUAL HINGED SIDE DELIVERY HEAD
FOR EXTRUDERS
Thomas Ashworth, Jr., 712 Marguerite Ave.,
Cuyahoga Falls, Ohio 44221
Filed Mar. 30, 1965, Ser. No. 443,977
9 Claims. (Cl. 18—12)

This invention relates to a dual hinged side delivery head for extruders whereby such extruder heads may be cleaned more efficiently, and which also provides a more laminar flow to material forced through the head for extrusion.

Heretofore it has been known that the cleaning operations on side delivery heads for extruders has been difficult and rather ineffectual at best because of the difficult access to the normal 90° passage through such side delivery heads, and the number of pockets formed because of the guider tube received through one outlet of the 90° passage. Further, the flow of material through such side delivery heads for extrusion tends to butt against the guider tube causing an uneven or non-laminar flow thereof. Thus, the uneven or non-laminar flow together with the problem of difficult cleaning has caused continual problems in side delivery heads on extrusion apparatus.

Therefore, it is the general object of the present invention to avoid and overcome the foregoing and other difficulties of and objects to prior art practices by the provisions of a side delivery head for extrusion apparatus utilizing a guider tube where the head is split down the center line of the guider tube and hinged therealong to provide ready access to the guider tube and the angular passage through the head to greatly facilitate cleaning thereof.

A further object of the invention is to provide a side delivery head for extrusion apparatus wherein a directional flow divider may be mounted to the tube to laminarily split the flow of material to be extruded to greatly enhance the laminar flow characteristics of the material to be extruded as it passes through the angular passage of the side delivery head, with the mounting of such flow divider beng possible because the side delivery head is split longitudinally substantially in half along the center line of the guider tube.

A further object of the invention is to provide a split side delivery head for extrusion apparatus which is hinged along the split with a guider tube received along the access of the split to facilitate insertion of the guider tube, and cleaning thereof upon completion of use.

A further object of the invention is to provide a directional flow divider associated with the guider tube which restricts the flow of material to be extruded more on the inner half of the angular passage through the delivery head than on the outer half to enhance laminar flow of the material through the head.

The aforesaid objects of the invention and other objects which will become apparent as the description proceeds are achieved by providing in a side delivery head for extrusion apparatus the combination of an extrusion housing defining a cylinder, a side delivery head defining an angular passage, said head being operatively mounted on the housing so one outlet of the passage is in concentric communication with the cylinder, said head being pivotally mounted with respect to the housing and split longitudinally substantially in half through the center of the other outlet of the passage, said halves having recesses aligned with the other outlet, means to hinge the split head along the split, means engaging the split halves to secure them in fluid tight relationship, a tube removably received in the recesses of the split halves of the head and held in fluid tight relation when the halves are held together in fluid tight relation, and a directional flow divider operatively mounted on the tube and received in the one outlet of the passage to divide material forced therein from the cylinder in a laminar flow around the tube.

For a better understanding of the invention reference should be had to the accompanying drawings wherein:

FIGURE 1 is a plan perspective view of the dual hinge side delivery head employing the principles of the invention;

FIGURE 2 is a plan perspective view, similar to FIGURE 1, wherein the dual hinge side delivery head is shown in the opened position exposing the guider tube;

FIGURE 3 is a perspective elevation showing the hinged relationship of the side delivery head to the base or extruder flange;

FIGURE 4 is a horizontal cross sectional view of the support head and side delivery in closed relationship as taken on line 4—4 of FIGURE 3; and FIGURE 5 is a vertical cross sectional view of the directional flow divider associated with the guider tube showing the general shape thereof.

With reference to the form of the invention illustrated in the drawings, the numeral 10 indicates generally an extruder housing defining a cylinder 12 with appropriate equipment (not shown) to force material for extrusion out through the cylinder in a direction indicated by the arrow 14, as seen in FIGURE 4.

A side delivery head, indicated generally by numeral 22, is operatively mounted on the housing 10 by a base or extruder flange 18 with a plurality of bolts 20, moutned in recessed position to the flange 18. The flange 18 has a concentric passage 18a therethrough which is aligned with the cylinder 12 when the flange 18 is mounted to the housing 10. The side delivery head 22 is mounted in pivotal relationship to the flange 18, by a pin 24 connecting an arm 26 from the head 22 to dual arms 28 extending from the side of the flange 18. The pin 24 may be held in pivotal relationship with respect to the arms 26 and 28, by any suitable means, such as a locking screw 30, as seen in FIGURE 4. The side delivery head 22 may then be positioned in fluid tight metal to metal relationship with the face 32 of the flange by a plurality of locking bolts or screws 34 engaging lugs 34a. It should be noted in this instance that a separate plate 42 is mounted in fixed relationship to the side delivery head 22 by suitable means, such as by welds 44, which plate 42 operatively mounts the hinge arm 26 and the lugs 34a thereon. The closed fluid tight relationship of the housing 10 and side delivery head is shown most clearly in FIGURES 1 and 2. Such hinged mounting of the side delivery head 22 with respect to the extruder flange 18 is substantially conventional in the art.

The side delivery head 22 contains an angular passage 40 which in this instance defines a 90° angle therethrough, although such side delivery heads may be provided with 30°, 60°, or other angular passages to perform their desired function. The inlet side of the passage 40 (i.e. nearest the flange 18) is aligned in communication with the passage 18a through the extruder flange 18 upon the pivotal fluid tight locking of such side delivery head in relation to the extruder flange, as best seen in FIGURE 4.

In order to provide a straining of the material to be extruded passing from the cylinder 12 of the housing 10 and through the opening 18a into the passage 40 of the side delivery head 22, a suitable screen support plate 46 is mounted in recessed relation in the flange 18 and the plate 42, as more clearly shown in FIGURE 4.

A guider tube, indicated generally by numeral 50, is removably mounted in an elongated open passage 52 in the side delivery head 22. The pasage 52 has contoured inner surfaces, as more clearly shown in FIGURE 2 to receive in close fitting complementary relationship, such guider tube 50. Essentially, the elongated hole 52 is concentrically aligned with the outlet of the angular passage 40 from the side delivery head 22. In other words the longitudinal axis of the passage or hole 52 is substantially perpendicular to the plane of such outlet opening of passage 40. This allows the tip end of the guider tube 50 to be positioned in concentric relation to such outlet opening, as more clearly shown in FIGURE 4, to provide an annular ring extrusion of material around the outside of the tube 50 through the outlet of passage 40, all in the well known manner.

A unique feature of the invention is provided in splitting the side delivery head 22 substantially along the axis of the passage or hole 52 and parallel to the plane of the inlet of the angular passage 40, if it be 90°, into halves 22a and 22b, as more clearly shown in the open position of FIGURE 2. The half 22a is mounted in a suitable hinged relation as at 22c to half 22b, as seen in FIGURE 2. Such splitting allows easy positioning of the guider tube 50 in the hole 52, and greatly facilitates cleaning of the rather detailed contours on the inner surface 40a of the passage 40. Such ability to clean easily facilitates passage or flow of material for extrusion around the tube 50 in the extensively contoured central portion 40a of the passage 40. Of course, the split half 22a of the side delivery head 22 must be held in fluid tight relationship to the other half 22b during operational use, and such relation is provided by a plurality of locking means or bolts 54 attached to half 22b and received in locking relationship behind blocks, or wedges 56 fixed to the split half 22a. This, it should be understood that the guider tube 50 may be removably positioned in the hole 52 upon the hinged opening of the half 22a relative to half 22b of the side delivery head 22. Removal of such guider tube 50 immediately provides ready access for cleaning of all material therefrom to thus enable the head to be used for extrusion of different material or to be ready for the next operation.

In order to control the thickness of the annular ring of material extruded from such side delivery head around the guider tube 50, a guider tube tip 60 is threadably positioned on the end of the guider tube 50. The tip 60 has a tapered base portion 62 which may be adjusted relative to a tapered portion of the outlet hole from the support head by a longitudinal adjustment of the guider tube 50 with rotation of an adjusting nut 64 that engages a threaded peripheral portion of the tube and that is journalled on both halves of the delivery head half 22, as best seen in FIGURE 4. The guide or guider tube 50 and the tip 60 may be made as a unit if desired. The guider tube 50 is locked in fixed angular relation relative to the side delivery head 22 by a locking key 66, as best seen in FIGURE 4. As per the usual practice an extruder die 70 is held in fixed relationship by a retaining ring 72, and adjusted in concentric alignment with the guider tube tip 60 by four adjusting screws 74 carried by the retaining ring 72 and bearing on a flange 76 at the base of the extruder die 70. The retaining ring 72 may be mounted in fixed relation to the side delivery head 22 by suitable removable means, such as bolts 78 seated in recesses in the head 22, as seen in FIGURE 3.

In order to provide suitable heating or cooling control to the side delivery head 22, heating and/or cooling passages 80 may be provided therein for connection by outlet openings 82 to appropriate hoses or fluid conducting means (not shown) for such passage of heating or cooling liquid, all in a well known manner, and dependent upon the particular material being extruded. Such outlet openings 82 are seen in FIGURE 3. The invention also contemplates utilization of suitable electric heating elements for the head 22.

Many attempts have been made to enhance the flow characteristics of material for extrusion through the angular passage 40 to insure an even and continuous flow around the concentric opening provided by the extruder tip 70 and the guider tube tip 60. Of course, generally, as is well known, wire or other elongated material to be coated by the concentric extrusion will pass through the center of the guider tube 50. One effort to control the flow has been to enlarge and specifically contour the central portion 40a of the angular passage 40, but still a somewhat stagnant flow area seems to occur on the axially outer side of the area 40a inside the side delivery head 22. To overcome this effect, as is well known in the art, a hole 90 extends from a stagnant flow area through the hinged half 22a of the side delivery head 22, and is controllably opened or closed by an angularly mounted valve, indicated generally by numeral 92. The valve 92, which is substantially conventional, controllably opens or closes the passage 90 at the point of contact with the passage 40, all in a well known manner. Generally, during extrusion operation the valve 92 will be cracked open slightly, as necessary and controlled because of the viscosity and peculiar characteristics of the material extruded to insure a flow through the semi-stagnant area at that point of the passage 40.

A distinguishing feature of the invention, possible only because of the split side delivery head feature described hereinabove, is available to enhance the flow of material for extrusion through the passage 40. Normally, the material passing through the passage 40 comes into abutting contact against the side of the guide tube 50 causing it to split around the top and bottom surfaces thereof in a somewhat random or turbulent fashion, possibly causing interruption of the flow of extrusion material, or a non-laminar flow out the annular ring shaped opening defined by the guider tube tip 60 and the extruder tip 70. In an effort to overcome this turbulent flow, a directional flow divider 100 is mounted in fixed relationship to the guider tube 50 and is substantially centrally positioned in the passage 40 so as to laminarly divide the material being extruded as it passes through the strainer plate 46 to insure a laminar and continuous flow around the guider tube 50 and to the final extrusion. Such directional flow divider 100 may be slidably positioned onto the guider tube 50 and then be welded, or otherwise secured into position, or it may be a split ring which may use removable screws or other type locking means to secure the divider 100 into position relative to the guider tube 50. The divider 100 has an elongate tapered wedge shaped projecting arm 102 which comes to what might be called a cutting or dividing edge 104 substantially adjacent and parallel to the strainer plate 46, as best seen in FIGURE 4. The width of the tapered arm 102 is slightly less than the width of the passage 40. The divider completely surrounds the guider tube 50, as more clearly seen in FIGURE 5.

The invention contemplates that the divider 100 will substantially follow the contour of the passage 40, as more clearly shown in FIGURE 4. However, as an important feature to the contour of the divider, it is contemplated that the flow space along area 100a on the inner side of the passage 40 will be slightly less or more restricted than the flow space along area 100b on the outer side of the passage 40, as clearly shown in FIGURE 4. This substantially eccentric relationship is also indicated by the thinner and thicker base portions indicated at 106 and 108, respectively, in FIGURE 5. The greater restricted flow on the inner side of the guider tube 50 and the passage 40 along area 100a makes it more difficult for material to be extruded to pass therearound thereby allowing the longer path on the outside to receive a full and adequate supply of material for extrusion to substantially enhance the extrusion process.

Thus, it is seen that the purpose of the directional flow divider 100 is to divide the extrusion material laminarly as it passes through the strainer 46 to insure a smooth and continuous flow of material around the tube 50 to eliminate the turbulence caused during the normal abutting or blunting of the material against the side thereof. Also, the restricted flow on the inner side of the passage 40 insures a more uniform and desirable flow of material. Likewise, any suitable raised ring or cam type restricting surface might be utilized to control the desired amount of restriction on the inner and outer sides of the tube 50, or along areas 100a and 100b, respectively. The invention contemplates that the longitudinal movement of the tube 50 with relation to the extrusion bore may also help control or enhance the restriction of material flowing therearound, much in the same manner as the concentric extrusion of material between the guider tube tip 60 and the extruder tip 70 is controllably provided.

Therefore, it is seen that the objects of the invention have been achieved by providing a hinged split side delivery head with a directional flow divider to enhance laminar flow of material through the side delivery head. The insertion of the directional flow divider is only possible because of the split side delivery head construction. Such splitting also greatly enhances the ability to clean material from the side delivery head at any desired time.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a side delivery head for extrusion apparatus the combination of
 an extrusion housing defining a cylinder,
 a side delivery head defining an angular open passage operatively mounted on the housing so one end of the passage is in concentric communication with the cylinder, said head being pivotally mounted with respect to the housing and being split longitudinally substantially in half through the center of the other end of the passage, said halves having recesses substantially centrally aligned therein along the axis of the other end,
 means to hinge together the split portions of the head,
 means engaging the split halves to secure them in fluid tight relationship,
 a tube removably received in the recesses of the split halves of the head and held in fluid tight relation when the halves are held together in fluid tight relation, one end of said tube being in concentric alignment and lying in the same plane as the other end of the passage, said end of said tube being of similar shape to the other end of the passage but slightly smaller.

2. A side delivery head according to claim 1 which includes a wedge shaped directional flow divider having a dividing edge operatively mounted on the tube and received in said one end of the angular passage to divide material forced therein from the cylinder into a laminar flow around the tube and as an extrusion from the other end of the passage.

3. A combination according to claim 1 where the angular passage is of substantially 90° in shape and the longitudinal split of the side delivery head is substantially parallel to the plane of said one end of the passage.

4. In a side delivery head for extrusion apparatus the combination of
 an extrusion housing defining a cylinder,
 an extruder flange adapter with a longitudinal hole therethrough removably mounted to the housing whereby the hole is substantially aligned with the cylinder,
 a side delivery support head having a hole therethrough of 90° shape mounted in hinged relation to the flange adapter whereby the inlet of the 90° hole is in aligned communication with the hole of the flange adapter, said support head being split along its full length substantially along the axis of the outlet of the 90° hole and parallel to the plane of the inlet of the 90° hole,
 means to hinge the split halves of the support head together,
 means to retain the split halves in fluid tight relation to each other,
 means to retain the support head in fluid tight relation to the flange adapter,
 a tube removably received by the support head along the split so as to be in concentric alignment with the outlet of the 90° hole, said outer diameter of the tube being slightly less than the diameter of the outlet to establish an exposed annular ring shaped hole between the outlet of the support head and the tube, said tube being held in place by the retention of the halves of the support head in fluid tight relation but being exposed for cleaning and/or removal by releasing said split halves and swinging them apart, and
 means to adjust the axial position of the end of the tube in the outlet of the support head to insure that the annular ring shaped hole is uniform in its annular thickness.

5. A combination according to claim 4 which includes a directional flow divider operatively mounted to the tube and received in the inlet of the 90° hole to divide material forced therein from the cylinder in a laminar flow around the tube.

6. A combination according to claim 4 which includes means to restrict the flow of material along the inner side of the 90° hole in comparison with the movement of material along the outer side of the 90° hole whereby a uniform flow of material will result around the tube from the annular ring shaped hole at the outlet of the 90° hole.

7. In a side delivery head for extrusion apparatus the combination of
 an extrusion housing defining a cylinder,
 an extruder flange adapter with a longitudinal hole therethrough removably mounted to the housing with the hole therethrough substantially aligned with the cylinder,
 a side delivery support head having an angled hole therethrough, said head being mounted in hinged relation to the flange adapter whereby the inlet of the hole will be in aligned communication with the hole of the flange adapter, said support head being split along its full length through the outlet end of the hole,
 means to hinge the split halves of the support head,
 means to retain the split halves in fluid tight relation to each other,
 means to retain the support head in fluid tight relation to the flange adapter,
 a tube removably received by the support head along the split so as to be in concentric alignment with the outlet of the hole, said tube shape being similar to the inlet of the hole, but slightly smaller to establish a uniform shaped opening between the inlet of the support head and the tube, said tube being held in place by the retention of the halves of the support head in fluid tight relation, and
 means to adjust the axial position of the tube relative to the support head to control the size of the uniform shaped opening.

8. A combination according to claim 7 which includes a directional flow divider operatively mounted to the tube and received in said one outlet of the angled hole to laminarly divide material forced therein from the cylinder in a laminar flow around the tube.

9. A combination according to claim 7 which includes means to restrict the flow of material along the inner side of the angled hole in comparison with the movement of material along the outer side of the angled hole whereby a uniform flow of material will result around the tube from the outlet of the angled hole.

References Cited by the Examiner
UNITED STATES PATENTS

| | | | |
|---|---|---|---|
| 441,808 | 12/1880 | Royle et al. | 18—113 |
| 1,993,384 | 5/1935 | Royle | 18—13 |
| 2,035,247 | 3/1936 | Royle | 18—13 |
| 2,239,408 | 4/1941 | Wallace | 18—13 |
| 2,511,986 | 6/1950 | Martin | 18—13 |
| 2,560,022 | 7/1951 | Formaz | 18—12 |
| 2,943,352 | 7/1960 | Van Ripper | 18—13 |

WILLIAM J. STEPHENSON, *Primary Examiner.*

UNITED STATES PATENT OFFICE
CERTIFICATE OF CORRECTION

Patent No. 3,304,579                      February 21, 1967

Thomas Ashworth, Jr.

It is certified that error appears in the above identified patent and that said Letters Patent are hereby corrected as shown below:

In the heading to the printed specification, lines 4 and 5, "712 Marquerite Ave., Cuyahoga Falls, Ohio 44221" should read -- Cuyahoga Falls, Ohio, assignor to Ashworth-McDade, Inc., Cuyahoga Falls, Ohio, a corporation of Ohio --.

Signed and sealed this 5th day of August 1969.

(SEAL)
Attest:

Edward M. Fletcher, Jr.                      WILLIAM E. SCHUYLER, JR.
Attesting Officer                              Commissioner of Patents